Figure 1:
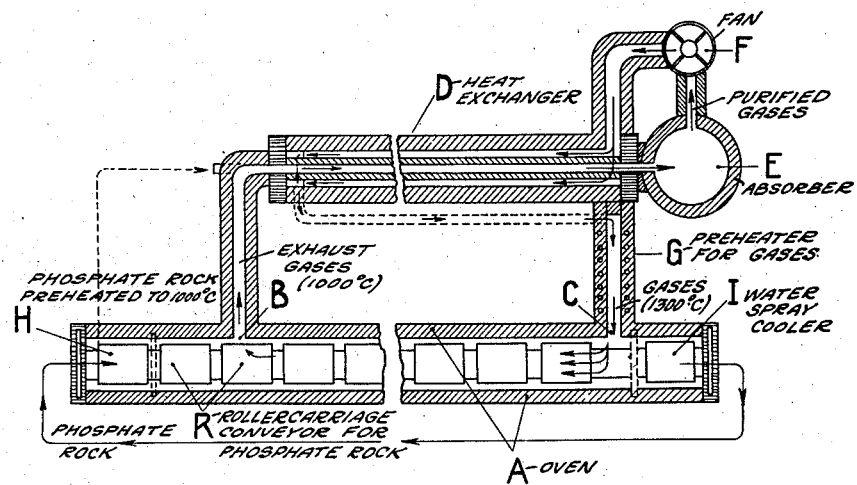

Feb. 6, 1940.  E. LÜSCHER  2,189,248

PROCESS FOR THE PRODUCTION OF PHOSPHATIC FERTILIZERS

Filed Jan. 7, 1937 2 Sheets-Sheet 1

Inventor:
Emil Lüscher,
Attorneys

Feb. 6, 1940.  E. LÜSCHER  2,189,248
PROCESS FOR THE PRODUCTION OF PHOSPHATIC FERTILIZERS
Filed Jan. 7, 1937  2 Sheets-Sheet 2

Inventor:
Emil Lüscher,
Attorneys

Patented Feb. 6, 1940

2,189,248

UNITED STATES PATENT OFFICE 2,189,248

PROCESS FOR THE PRODUCTION OF PHOSPHATIC FERTILIZERS

Emil Lüscher, Basel, Switzerland, assignor to Lonza Elektrizitatswerke und Chemische Fabriken Aktiengesellschaft (Gampel und Basel), Basel, Switzerland Application January 7, 1937, Serial No. 119,520
In Switzerland January 13, 1936

11 Claims. (Cl. 71—44)

The invention relates to a process for producing in particular easily assimilated phosphatic fertilizers by the action of steam or gases containing steam on initial substances containing phosphate, and in particular phosphate rock, if necessary with the addition of substances promoting decomposition.

The invention relates furthermore to the use of the initial substances in a form particularly facilitating the action of the water vapour and also to the use of the decomposition material in the form of mixtures particularly advantageous from the point of view of its resistance to temperature and pressure as also its porosity.

It is known that crude phosphates can be transformed into a state adapted to be assimilated by plants by heating, for example to a red heat, in the presence of steam, with or without additions such as siliceous materials or alkali or alkaline earth compounds.

The carrying out of these processes in practice is accompanied by considerable difficulties, since the decomposition of the crude phosphates at a useful speed and completeness only takes place in the vicinity of the sintering temperature. It is consequently not a simple matter to so regulate the temperature that the product of the reaction does not cake together, which would make the further decomposition and also the carrying out of the treatment extremely difficult. If on the contrary the sintering temperature is intentionally exceeded, that is, treatment is carried out in the fused liquid condition, then, as is known, the choice of a suitable furnace lining presents great difficulties on account of the strong attack by the fused liquid mass on the known refractory ceramic products.

In particular in the decomposition of phosphate mixtures free from alkali it is of importance for obtaining easily assimilable products, that the fluorine is driven off as completely as possible. It is also known that this can be largely assisted by additions of siliceous material and the cooperation of water vapour or steam. In particular the removal of the last residues of fluorine necessitates much time and considerable quantities of steam. The attainable decomposition output is here, apart from the reaction temperature, dependent upon the size and constitution of the grain. With large grains comparatively much time is needed in order to complete the decomposition in the interior of the grain, whilst with small grains the speed of the reaction is correspondingly greater though with lesser size of grain the danger of caking together is greatly increased.

Taken altogether the known processes working with steam, and in particular where no alkali compounds are present, have been found from an economical point of view either unsatisfactory or unusable, since with a small consumption of steam the furnace output is low, whilst those quantities of water which ensure a useful furnace output necessitate too great a consumption of energy, (see for example, H. L. Marshall, in Industrial Eng. Chemistry, February 1935).

In view of the low costs which the treatment of such phosphates will bear it is however necessary to strive for the greatest possible economy in energy and to ensure a simple and as reliable as possible a working procedure.

It has been found that the above-mentioned disadvantages of the known processes can be avoided in a simple manner by causing steam or a gas containing steam to act in closed circulation first at the temperature of conversion on the material containing phosphates, if necessary in the presence of additional substances such as silicic acid, alkali or alkaline earth compounds, then removing from the gas carried away, from the furnace, the fluorine and other volatile reaction products contained in this gas and formed by the heating process, by means of a heated absorption system, and finally carrying back the purified gas at least partially and by heat exchange with the gases directly leaving the furnace, into the decomposition process.

The use of large quantities of steam in proportion to the crude phospate employed has been found advantageous from various points of view. In particular the steam facilitates the exit of the fluorine or respectively the destruction of the apatite structure of the crude phosphates. It furthermore keeps the surface of the grain capable of reaction and can be used for regulating the reaction temperature, which for the purpose of carrying out the heating to a red heat free from disturbance must be kept within comparatively narrow limits. It is consequently desirable to cause the largest possible quantity of steam to act on the decomposition product containing phosphates. On the other hand however the quantity of steam permissible in practice is limited by the economical limits of heat consumption.

According to the invention for the first time and by the utilisation of a large part of the heat content of the exhaust gases of the decomposition process, the use of comparatively large quantities of steam is permitted in the simplest manner and with a consumption of energy which can be economically supported.

In order to remove from the exhaust gases of the decomposition process, the volatile compounds such for example as HF, $SiF_4$, $H_2SiF_6$, $SO_2$, $CO_2$, HCl liberated in this process, with the least possible heat losses, according to the invention the exhaust gases can for example be made to act on aqueous liquids, e. g., aqueous solutions or suspensions of for example substances adapted for the chemical combining of the said substances, say at their boiling temperature, so that no condensation of appreciable quantities of steam from the gases can here take place and heat need not be expended for the evaporation of water.

The combining of the volatile reaction products can also take place by means of solid absorption agents, e. g., in granular or briquette form. In this case, the absorption temperature may be considerably above the boiling point of the water.

After being freed from volatile reaction products, the steam carried in circulation or the steam-containing gas, for example an air mixture rich in steam, is according to the invention heated as thoroughly as possible by means for example of known heat exchanging devices by the hot exhaust gases escaping directly from the decomposition process.

A further preheating can for example take place by the supply of external heat, for example in a superheater of known character, so that if necessary the entire heat requirement of the decomposition process can be met by the heat content of the steam or steam-containing gaseous mixture entering the decomposition zone, without the use of any external heating of the latter. By suitably regulating the degree of preheating and the speed of circulation of the steam or gaseous mixture containing the same and kept in circulation, according to the invention the reaction temperature can be kept with extraordinary ease within the desired limits. By a suitable conveyance of the gases, the heat content of the prepared product and if necessary of the conveyor devices can be recuperated.

It is, as is known, difficult to heat solid materials, heaped up in a thick layer in a comparatively short time and uniformly over the whole cross-section, by the supply of external heat. This difficulty is overcome, according to the invention, by the necessary heat being at least partially transferred directly to the material to be decomposed by the steam or steam-containing gas carried in circulation and serving as heat carrier. In this way it is possible, owing to the large energy content of the great quantities of steam capable of use according to the invention, easily to adhere to the narrow limits of the reaction temperatures coming practically into question, over the whole cross-section of the furnace, and to obviate in particular the objectionable local over-heating which opposes a uniform working free from interruption and the obtaining of a uniform product with known processes. In this way, the working reliability and simplicity of the operations is considerably improved.

The conveying of the gases takes place preferably in counter current to the reaction material, so that for example gases free from fluorine come first into contact with the glowing material least rich in fluorine. In this case also, the purified fresh gases preheated by heat exchange in the manner described can be further preheated by the supplementary supply of heat from the outside, for example in a superheater, so that they are brought into contact at the highest reaction temperature directly with that decomposition material which first leaves the furnace as a prepared product. The latter can be further treated in the glowing state in the furnace itself or in an extension thereof or in a separate space, with a portion of the gases before their re-entry into the furnace and/or with water, whereby in addition to the rapid cooling of the decomposition product which may be necessary, a utilisation of the heat content thereof is possible by the preheating of the gases or the formation of fresh steam.

It is advisable to take care that the fresh decomposition material only comes into contact in a preheated state of at least 500° C. and preferably at 1000° C. with the hot circulated gases, especially when the latter are rich in fluorine compounds, since otherwise there is the danger that the surface of the grains is attacked and glazed by the reactive fluorine compounds.

The present process can be used in all "glow" processes and fusing processes working with steam for the transforming of raw products containing phosphate, with or without additions, into (assimilable) phosphatic fertilizers. In carrying it out, furnaces will be used which are combined with a heat recuperating closed gas circulating system for the withdrawal and redelivery of the gases containing water vapor out of and into the furnace, and with a device for removing the volatile reaction products and if necessary with a separate gas superheater for heating the fresh gases. The process is particularly adapted for the production of so-called sinter phosphates in which fusion of the products does not take place.

For carrying out the process described, furnaces of the most varied character can be used and with particular advantage for example conduit and shaft furnaces, since these permit a more or less continuous working with comparatively thick or long layers, which is very advantageous for the utilisation of the steam for driving off the fluorine.

The foregoing principle can also be used, suitably altered for rotating furnaces, when preferably the steam superheated by additional external supplies of heat is used as the direct source of heat.

The selection of a suitable size of grain of the heating material has been found important for satisfactorily carrying out the decomposition process and the circulation of steam.

Small grained material, for example that with a size of grain of 3–4 mm. or less, is suitable only for an operation in which the material is kept constantly in movement, as for example in rotating drum furnaces. With stationary methods, however, it easily cakes together and presents great resistance to the passage of the gas, so that in practice only very thin layers can be used. This has, however, as a consequence that the useful effects of the steam rapidly falls below the value which can be borne in practice.

On the other hand, tests have shown that phosphorite clinkers of more than about 5 mm. diameter show with increasing diameter a strongly retarded yield of fluorine. A medium grain such for example as clinkers of about 5–10 mm. diameter, shows in addition to too low a reaction capacity, also too great a gas resistance, and is consequently not adapted for example for shaft furnaces. For conduit furnaces such sizes of grain cannot in the first place come into consideration since the form of clinker is unsuited for the working of such furnaces.

It has now been found that lump material can be used if the phosphorite, if necessary with additional substances such for example as quartz and lime, etc., in powdered condition and preferably with the addition of binding agents, is mixed and suitable shaped pieces are made therefrom, if necessary under pressure, for example in the form of the known fillers for reaction towers. Such shaped pieces made for example in the form of so-called Raschig rings with 20–30 mm. thickness of wall yield as much fluorine as for example natural grains of 4–5 mm. in thickness. These large shaped pieces have for the present process the considerable advantage that in the first place they present a comparatively small resistance to the circulating gases, and secondly, which is equally of great importance, that with them the danger of caking together existing with too small a diameter of the pieces, for example when they are less than 3–4 mm., is entirely obviated. By the use of comparatively large pressed pieces, furthermore, the danger of the glazing of the surface and with it the stopping up of the pores is to a large extent avoided, and thus the driving out of the fluorine compounds can take place continuously under favourable conditions. Contrary thereto, it is observed with the small grained raw material, e. g., of 1–3 mm. diameter, in itself very capable of reaction, that usually even with a comparatively small thickness of layer a rapid falling off of the initially very large yield of fluorine takes place and this in consequence of glazing and encrusting of the surface, unless the material is kept constantly in movement.

For conduit furnaces special attention must be paid, in the shaping of the pressed articles, to the particular nature of this method of operation, since the shaped pieces must not, as with shaft furnaces, come into contact with the furnace walls and must be placed so loosely and suitably that the passage of the gas in view of the great length of the furnace is as unrestricted as possible and takes place in uniform distribution over the whole cross-section of the furnace. A pressed form suitable for this is shown by way of example by the plate shape indicated in Fig. 2.

Other pressed shapes as for example the above-mentioned Raschig rings, can generally only be used in conduit furnaces by the use of conveyor devices such for example as roller carriages of cage-like construction.

The reaction capacity of the shaped pieces according to the invention depends essentially upon the nature of their manufacture and composition. It is important that the shaped pieces should be not only sufficiently large but also sufficiently resistant to pressure and temperature and have a porous or fine pored structure. This can, for example, be attained or facilitated by the addition of substances which in the course of the glowing process give off gases or produce small hollow spaces by local reductions in volume. Such additional substances are preferably sulphates and carbonates, as for example, gypsum or powdered limestone.

It has furthermore been found that in working according to the present invention, the expulsion of the fluorine can be considerably facilitated if the fresh reaction product (fresh product) is mixed with a portion of the final product (old material) already heated. To this end, the said initial materials are finely ground, thoroughly mixed and then granulated to the desired size of grain or worked into shaped pieces, for example with the use of pressure (briquetted).

For it has been shown that mixtures which in addition to crude phosphates at the same time contain calcium oxide and silica in considerable quantities, are mostly subjected on heating to over, say 1200° C. to rapid considerable variations with respect to resistance to pressure and stability of volume which becomes noticeable by troubles caused when used in the form of larger pressed pieces owing to sintering phenomena. Such sintered reaction products have in addition a remarkably dense and even glassy structure whereby the full expulsion of the fluorine is made very difficult. This dense structure has, however, nothing to do with the known glazing phenomena which are mainly observed on the surface of the grains during the heating process if the material to be sintered is not sufficiently preliminarily heated, so that the fluorine compounds dissociated in the hot zone can again enter into reaction with the fresh material and become deposited thereon with the formation of a glaze on the surface. The densifying of the structure of the said highly heated sintering phosphates is an entirely different phenomenon which takes place within the entire reaction material. It is due to the properties of the initial substances and takes place for example also when the working is fully isothermal, that is, when the fresh material is preheated in the absence of steam to the same temperature at which later on the expulsion of the fluorine is carried out. The reduction of the granular volume can here amount to 10–20% or more.

The mixture ratio between crude product and sintered final product can here be chosen of different degrees, e. g., 0.5–1 part of old material to 1 part of fresh product. It has been found advisable to use the added old material with a somewhat coarser grain than the fresh material, thus for example with a size of grain of about 0.1–0.5 mm. with a size of grain of the fresh material of about 0 to 0.1 mm.

By the addition of old material to the material to be decomposed, according to the invention its pressure and volume stability is greatly increased, so that in the decomposing process higher temperatures can be used continuously from the commencement as without any addition of old material, whereby there is attained a corresponding shortening of the reaction period and an improvement parallel therewith of the steam utilisation, i. e., the thermal efficiency of the installation. A further advantage of the admixture of the old material consists in the expulsion of the fluorine from the inner parts of the material to be decomposed being facilitated by increasing the porosity of the grain.

Figure 2:
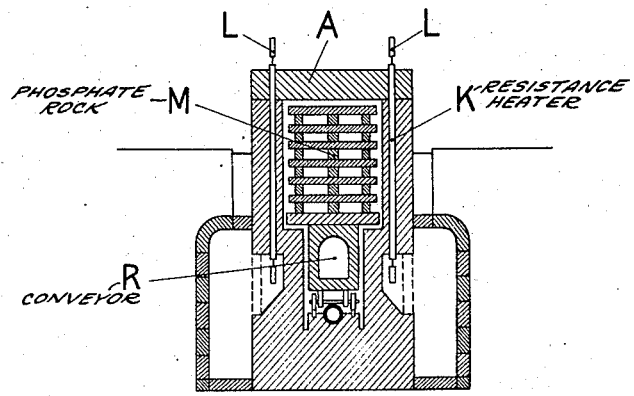
Figure 3:
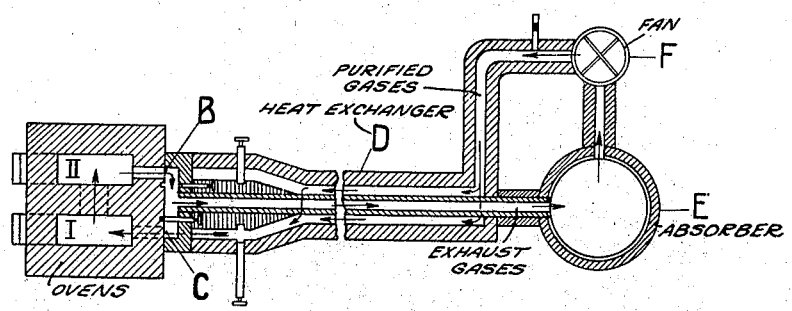
Figure 4:
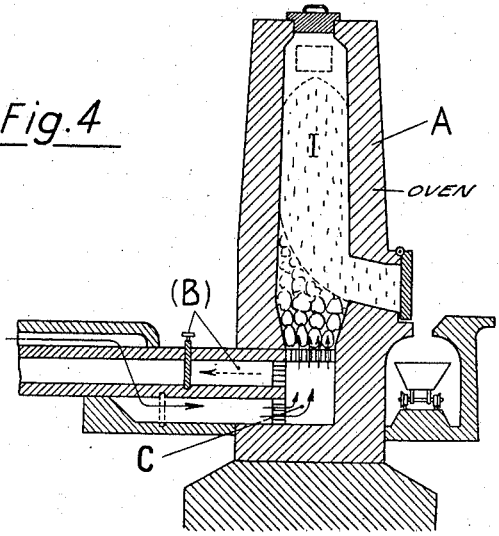

In the drawings, Fig. 1 shows by way of example a longitudinal section through a device adapted for carrying out the process according to the invention and provided with a conduit furnace, and Fig. 2 is a cross-section through the furnace thereof. Fig. 3 shows in longitudinal section a device provided with two alternately operated shaft furnaces I and II, and Fig. 4 is a vertical section through the furnace I thereof, together with the adjacent parts of the gas leads.

In Fig. 1, A is a conduit oven built of fireproof material. D is the heat exchanger in which the hot exhaust gases emerging at B from the furnace heat up the fresh gases entering the furnace at C. E is the absorber inserted in the gas circulation system in which are absorbed the volatile reaction products for example by a boiling solution of milk of lime. The absorption process is so regulated that the purified gases emerging from the absorber contain as much water vapour as those entering. The purified vapours are then exhausted from the absorber by a fan F and forced through the heat exchanger D into the furnace at C. Before entering the furnace, the gases are preheated by the superheater G to the necessary reaction temperature. The crude phosphate is introduced into the conduit furnace by a roller carriage R insulated from heat in the lower part, at the point H, and before reaching the exhaust gas outlet point are preheated to about 1000° C. Here, the product comes into contact with the exhaust gases containing fluorine and heated for example to about 1000° C., and is freed from a portion of its content in fluorine. By further progress in the furnace, it comes into contact with still hotter gases but gases containing less fluorine, so that it reaches at the point of the gas inlet at C, for example about 1300° C., and has by this time given up entirely its fluorine. In the last section I of the conduit the product is rapidly cooled by a water spray with the development of steam.

The furnace can for example be heated with cheap electrical energy by an electric resistance heating. If the separate gas superheater is so built that it is able to supply so much heat to the circulating gases that the total heat requirements for the reaction and the radiation from the furnace is covered (maintaining the reaction temperature), a separate heating of the furnace walls may be dispensed with. By these means, it is possible to adjust the reaction temperature with extraordinary exactitude and constancy, whereby owing to the increased gas circulation the reaction process (furnace output) is improved.

In Fig. 2, K indicates the electric resistance fitted in the furnace wall and supplied from the bus bars L. R is the roller carriage on which the crude product is heaped up for example in the form of plate shaped pressed pieces M.

With the device according to Figures 3 and 4, in which corresponding parts are indicated by the same letters as those in Figs. 1 and 2, the shafts I and II are periodically filled and emptied alternately and consequently also the valves for the gas circulation effected by the fan or pump F are periodically controlled. Whilst, for example, in the shaft II there is fresh product containing fluorine, the shaft I is filled with product with already less content in fluorine. The hot steam-containing, fluorine free gases coming from the heat exchanger D pass at C into the lower part of the shaft I, flow through this from the bottom upwards, whereby the glowing material which is in the shaft is freed from the last contents of fluorine, whereupon the gases leave the shaft at the upper end and pass at the same level into the shaft II. In this they move from the top downward withdrawing from the glowing material a part of its fluorine content and then pass into the heat exchanger D, where they give up their heat content for the most part to the fresh gas. At the end of the heat exchanger, the gases are freed in the absorber E from the volatile reaction products, whereupon they are again supplied through the fan as fresh gases to the furnace through the heat exchanger. The absorber can for example be filled with solid soda lime pressed pieces and be kept at temperatures between about 200°–300° C. so that steam is not condensed therein. The furnace is preferably heated electrically.

I claim:

1. In a process for the production of easily assimilable phosphatic fertilizers from crude phosphates by decomposing said crude phosphates by heating in the presence of steam, the improvement which comprises passing a hot steam-containing gaseous medium over a material containing crude phosphates in direct contact therewith, which material has been preheated to at least 500° C. before coming in contact with any of said gaseous medium passed thereover while heating said material to the temperature necessary for the decomposition and maintaining the temperature of said rock substantially above 500° C. during the entire period of contact with said gaseous medium, contacting the gaseous medium which has been passed over said material with a material capable of removing therefrom the fluorine compounds and the other volatile products of the decomposition while preventing a decrease in the steam content and a loss of heat through condensation, bringing an amount of the purified gaseous medium in heat exchange relationship with the gaseous medium which has been passed over said phosphate containing material but before said gaseous medium has been purified and thereafter recirculating such amount of the heated purified gaseous medium containing steam over said phosphate containing material, such amount of steam which is recirculated being at least sufficient to prevent reduction of the amount of steam in circulation, said recirculation being such that a considerable amount of steam with reference to the phosphatic material is continuously recirculated over said material.

2. In a process for the production of easily assimilable phosphatic fertilizers from crude phosphates by decomposing said crude phosphates by heating in the presence of steam, the improvement which comprises passing a hot steam-containing gaseous medium over a material containing crude phosphates in direct contact therewith, which material has been preheated to at least 1000° C. before coming in contact with any of said gaseous medium passed thereover while heating said material to the temperature necessary for the decomposition and maintaining the temperature of said rock substantially above 1000° C. during the entire period of contact with said gaseous medium, contacting the gaseous medium which has been passed over said material with a material capable of removing therefrom the fluorine compounds and the other volatile products of the decomposition while preventing a decrease in the steam content and a loss of heat through condensation, bringing an amount of the purified gaseous medium in heat exchange relationship with the gaseous medium which has been passed over said phosphate containing material but before said gaseous medium has been purified and thereafter recirculating such amount of the heated purified gaseous medium containing steam over said phosphate containing material, such amount of steam which is recirculated being at least sufficient to prevent reduction of the amount of steam in circulation, said recirculation being such that a considerable amount of steam with reference to the phosphatic material is continuously recirculated over said material.

3. In a process for the production of easily assimilable phosphatic fertilizers from crude phosphates by decomposing said crude phosphates by heating in the presence of steam, the improvement which comprises passing a material containing crude phosphate through a space heated to the temperature necessary for the decomposition and passing countercurrently thereto and in direct contact therewith through said heated space a hot steam containing gaseous medium but only to such point in said heated space where said phosphate containing material has already attained a temperature of at least 500° C. and maintaining the temperature of said rock substantially above 500° C. during the entire period of contact with said gaseous medium contacting the gaseous medium which has been passed over said material with a material capable of removing therefrom the fluorine compounds and the other volatile products of the decomposition while preventing a decrease in the steam content and a loss of heat through condensation, bringing an amount of the purified gaseous medium in heat exchange relationship with the gaseous medium which has been passed over said phosphate containing material but before said gaseous medium has been purified and thereafter recirculating such amount of the heated purified gaseous medium containing steam over said phosphate containing material, such amount of steam which is recirculated being at least sufficient to prevent reduction of the amount of steam in circulation, said recirculation being such that a considerable amount of steam with reference to the phosphatic material is continuously recirculated over said material.

4. In a process for the production of easily assimilable phosphatic fertilizers from crude phosphates by decomposing said crude phosphates by heating in the presence of steam, the improvement which comprises passing a hot steam-containing gaseous medium over a material containing crude phosphates in direct contact therewith which material has been preheated to at least 500° C. before coming in contact with any of said gaseous medium passed thereover while heating said material to the temperature necessary for the decomposition and maintaining the temperature of said rock substantially above 500° C. during the entire period of contact with said gaseous medium, contacting the gaseous medium which has been passed over said material with a fluid which is heated substantially to its boiling point and which is capable of removing therefrom the fluorine compounds and the other volatile products of the decomposition while preventing a decrease in the steam content and a loss of heat through condensation, bringing an amount of the purified gaseous medium in heat exchange relationship with the gaseous medium which has been passed over said phosphate containing material but before said gaseous medium has been purified and thereafter recirculating such amount of the heated purified gaseous medium containing steam over said phosphate containing material, such amount of steam which is recirculated being at least sufficient to prevent reduction of the amount of steam in circulation, said recirculation being such that a considerable amount of steam with reference to the phosphatic material is continuously recirculated over said material.

5. In a process for the production of easily assimilable phosphatic fertilizers from crude phosphates by decomposing said crude phosphates by heating in the presence of steam, the improvement which comprises passing a hot steam-containing gaseous medium over a material containing crude phosphates which has been preheated to at least 500° C. before coming in contact with any of said gaseous medium passed thereover while heating said material to the temperature necessary for the decomposition and maintaining the temperature of said rock substantially above 500° C. during the entire period of contact with said gaseous medium, contacting the gaseous medium which has been passed over said material with a solid capable of removing therefrom the fluorine compounds and the other volatile products of the decomposition while preventing a decrease in the steam content and a loss of heat through condensation, bringing an amount of the purified gaseous medium in heat exchange relationship with the gaseous medium which has been passed over said phosphate containing material but before said gaseous medium has been purified and thereafter recirculating such amount of the heated purified gaseous medium containing steam over said phosphate containing material, such amount of steam which is recirculated being at least sufficient to prevent reduction of the amount of steam in circulation, said recirculation being such that a considerable amount of steam with reference to the phosphatic material is continuously recirculated over said material.

6. In a process for the production of easily assimilable phosphatic fertilizers from crude phosphates by decomposing said crude phosphates by heating in the presence of steam, the improvement which comprises passing a hot steam-containing gaseous medium over a material containing crude phosphates in the form of porous briquettes in the shape of known fillers for reaction towers, which material has been preheated to at least 500° C. before coming in contact with any of said gaseous medium passed thereover while heating said material to the temperature necessary for the decomposition and maintaining the temperature of said rock substantially above 500° C. during the entire period of contact with said gaseous medium, contacting the gaseous medium which has been passed over said material with a material capable of removing therefrom the fluorine compounds and the other volatile products of the decomposition while preventing a decrease in the steam content and a loss of heat through condensation, bringing an amount of the purified gaseous medium in heat exchange relationship with the gaseous medium which has been passed over said phosphate containing material but before said gaseous medium has been purified and thereafter recirculating such amount of the heated purified gaseous medium containing steam over said phosphate containing material, such amount of steam which is recirculated being at least sufficient to prevent reduction of the amount of steam in circulation, said recirculation being such that a considerable amount of steam with reference to the phosphatic material is continuously recirculated over said material.

7. In a process for the production of easily assimilable phosphatic fertilizers from crude phosphates by decomposing said crude phosphates by heating in the presence of steam, the improvement which comprises passing a material containing crude phosphate through a space heated to the temperature necessary for the decomposition and passing countercurrently thereto through said heated space a steam containing gaseous medium but only to such point in said heated space where said phosphate containing material has already attained a temperature of at least 500° C., contacting the gaseous medium which has been passed over said material with a material capable of removing therefrom the fluorine compounds and the other volatile products of the decomposition while preventing a decrease in the steam content and a loss of heat through condensation, bringing the purified gaseous medium in heat exchange relationship with the gaseous medium, which has been passed over said phosphate containing material but before said gaseous medium has been purified, further heating said purified gaseous medium so that it acquires the temperature necessary for the decomposition of the phosphate, contacting said heated purified gaseous medium with the decomposed material containing phosphates leaving said heated space and recirculating an amount of the heated purified gaseous medium containing steam over said phosphate containing material which is sufficient to maintain the amount of steam in circulation constant.

8. In a process for the production of easily assimilable phosphatic fertilizers from crude phosphates by decomposing said crude phosphates by heating in the presence of steam, the improvement which comprises passing over a crude phosphate in admixture with a phosphate which has already been decomposed which mixture has been preheated to at least 500° C. while heating said material to the temperature necessary for the decomposition, contacting the gaseous medium which has been passed over said material with a material capable of removing therefrom the fluorine compounds and the other volatile products of the decomposition while preventing a decrease in the steam content and a loss of heat through condensation, bringing the purified gaseous medium in heat exchange relationship with the gaseous medium which has been passed over said phosphate containing material but before said gaseous medium has been purified and recirculating an amount of the heated purified gaseous medium containing steam over said phosphate containing material which is sufficient to maintain the amount of steam in circulation constant.

9. In a process for the production of easily assimilable phosphatic fertilizers from crude phosphates by decomposing said crude phosphates by heating in the presence of steam, the improvement which comprises passing a steam containing gaseous medium over a material containing crude phosphates which has been preheated to at least 500° C. while heating said material to the temperature necessary for the decomposition, contacting the gaseous medium which has been passed over said material with a material capable of removing therefrom the fluorine compounds and the other volatile products of the decomposition while preventing a decrease in the steam content and a loss of heat through condensation, bringing the purified gaseous medium in heat exchange relationship with the gaseous medium which has been passed over said phosphate containing material but before said gaseous medium has been purified, further heating said purified gaseous medium and recirculating an amount of the heated purified gaseous medium containing steam over said phosphate containing material which is sufficient to maintain the amount of steam in circulation constant.

10. A process according to claim 1 comprising in addition heating the purified gaseous medium containing steam further by contact with the hot phosphatic decomposition products before it is recirculated over the phosphate containing material.

11. A process according to claim 1 comprising in addition contacting water with the hot decomposition product to introduce fresh steam into the recirculated gaseous medium.

EMIL LÜSCHER.